US012269183B2

(12) United States Patent
Van Cauwenberghe

(10) Patent No.: US 12,269,183 B2
(45) Date of Patent: Apr. 8, 2025

(54) OBLIQUE BREAD SLICER

(71) Applicant: JAC S.A., Liège (BE)

(72) Inventor: Baudouin Van Cauwenberghe, Liège (BE)

(73) Assignee: JAC S.A., Liege (BE)

(*) Notice: Subject to any disclaimer, the term of this patent is extended or adjusted under 35 U.S.C. 154(b) by 0 days.

(21) Appl. No.: 17/313,481

(22) Filed: May 6, 2021

(65) Prior Publication Data

US 2021/0347078 A1 Nov. 11, 2021

(30) Foreign Application Priority Data

May 6, 2020 (BE) .................................. 2020/5304

(51) Int. Cl.
*B26D 1/09* (2006.01)
*B26D 7/06* (2006.01)

(52) U.S. Cl.
CPC ............ *B26D 1/09* (2013.01); *B26D 7/0608* (2013.01); *B26D 2210/06* (2013.01)

(58) Field of Classification Search
CPC .... B26D 1/09; B26D 7/0608; B26D 2210/06; B26D 2007/327; B26D 7/0616; B65B 25/18; B65B 67/04
See application file for complete search history.

(56) References Cited

U.S. PATENT DOCUMENTS 1,992,166 A * 2/1935 Beauclerk .............. B65B 67/04 53/260
2,031,264 A * 2/1936 Kennebeck ............ B65B 25/18 53/260
4,833,861 A * 5/1989 Hale ....................... B65B 67/04 53/390
5,477,662 A * 12/1995 Rompa .................. B65B 43/34 53/571
2014/0366696 A1* 12/2014 Weiss ....................... B26D 7/06 83/162
2016/0346949 A1 12/2016 Siller
2019/0337178 A1 11/2019 Siller
2023/0060366 A1* 3/2023 Korell ...................... B26D 1/16

FOREIGN PATENT DOCUMENTS

AU 2006201074 A1 * 10/2006
DE 4431808 A1 * 3/1995 .............. B26D 7/01
DE 102010015367 A1 * 10/2011 .............. B26D 7/32
DE 102012100586 A1 * 7/2013 .............. B26D 7/32
DE 102010015367 B4 * 3/2021 .............. B26D 7/32
(Continued)

*Primary Examiner* — Jonathan G Riley
(74) *Attorney, Agent, or Firm* — FISHERBROYLES, LLP; Roger L. Browdy; Ronni S. Jillions

(57) ABSTRACT

A bread slicer comprising
- a loading compartment (6) adjacent to the front side (2) which is connected to a receiving compartment (7) situated near the rear side (3) of the bread slicer,
- an access opening (8) for placing a loaf of bread (16) to be sliced in the loading compartment (6) by a user who is positioned in front of the front side (2),
- a cutting member to cut slices off the bread (16) as it is moved between said compartments (6,7),
- a support surface (9) for the bread (16) extending in said compartments (6,7)

The support surface (9) is inclined at an angle (α) between 25° and 70° with respect to a horizontal line.

11 Claims, 8 Drawing Sheets

(56) References Cited

FOREIGN PATENT DOCUMENTS

| | | | | | |
|---|---|---|---|---|---|
| EP | 0615821 | A1 | | 9/1994 | |
| EP | 1857233 | A1 | | 11/2007 | |
| EP | 2799345 | A1 | * | 11/2014 | ............. B26D 1/157 |
| EP | 3102376 | A1 | | 12/2016 | |
| EP | 3127667 | A1 | * | 2/2017 | |
| EP | 3919243 | A1 | * | 12/2021 | ............. B26D 7/088 |
| WO | WO-2017021381 | A1 | * | 2/2017 | ........... B26D 7/0608 |

* cited by examiner

OBLIQUE BREAD SLICER

The invention relates to a bread slicer with a frame having a front side opposite a rear side and two lateral sides extending between the front side and the rear side. This slicer is designed to be operated by a user who is located at the front side of the machine. The slicer includes:

- a loading compartment that is connected to a receiving compartment; the loading compartment is adjacent to the front side and the receiving compartment is near the rear side of the slicer frame,
- an access opening for the loading compartment for placing a loaf of bread to be sliced in that compartment; the access opening is accessible from said front side by a user who is positioned in front of that front side for placing a loaf of bread to be sliced in the loading compartment and for retrieving the loaf of bread after it has been sliced,
- a cutting member which can move along a cutting plane to cut slices off the bread as it is moved between said compartments,
- a support surface for the bread extending into said compartments and having a slot between the compartments to allow the passage of the cutting member along said cutting plane; the support surface defines a direction of travel of the bread between the front side and the rear side of the frame which extends parallel to the support surface,
- a movable push rod which can move in said direction of travel of the bread in order to move the bread between said compartments through the cutting plane;
- a movable support which can move in said direction of travel in order to support the bread to be cut or the slices of the cut bread.

Slicers that have the above-mentioned features are, for example, described in EP 3 102 376. This document describes a slicer with a support surface for the bread to be sliced that is slightly inclined with respect to a vertical direction. In this slicer, the receiving compartment is adjacent to the front side of the slicer and the loading compartment is closer to the rear side than the receiving compartment. Thus, when a loaf of bread to be sliced is placed in the loading compartment of this slicer by a user, the loaf descends and approaches the user while being cut. Since the loading compartment is further back than the receiving compartment in relation to the user, the user must pick up the sliced bread from the loading compartment in a non-ergonomic manner. In addition, a loaf of bread placed in the loading compartment is not stable in its upright position and may tip over.

A second slicer described in EP 3 102 376 has a horizontally extending support surface. The loading compartment of the slicer is located facing the user on the front side, while the receiving compartment is situated near the rear side of the slicer. The bread is sliced by a circular blade as it is moved from the receiving compartment to the loading compartment on the front side of the slicer. With such a horizontal slicer, the user must lean relatively far forward to retrieve the cut bread from the loading compartment. This is not optimal from an ergonomic point of view and it is sometimes cumbersome to put the sliced bread in a bag. Moreover, the cutting quality of such a horizontal slicer is not always satisfactory.

The invention aims to remedy these disadvantages and to propose a slicer which allows an optimized cutting quality to be obtained as well as improved ergonomics for the user of the slicer.

To this end, according to the invention, the aforementioned support surface is inclined at an angle ($\alpha$) of between 25° and 70° with respect to a horizontal line which extends perpendicularly to the front side of the slicer. This angle ($\alpha$) is, in particular, between 30° and 60° and is preferably between 35° and 55°.

Advantageously, the slicer according to the invention comprises a bagging pallet which is provided in the loading compartment. This pallet can be moved between a receiving position in which the pallet extends in the plane of the support surface and a bagging position in which at least one end of the pallet is elevated in relation to the plane of the support surface.

According to a particular embodiment of the invention, the bagging pallet comprises a base plate and a stop plate, which can be moved in relation to each other, and which extend along the plane of the support surface in said receiving position. In the bagging position, the stop plate extends substantially transversely to the base plate so as to allow a cut loaf to be supported on the base plate and against the stop plate.

According to an interesting embodiment of the invention, the bagging pallet is mounted such that it can pivot about a horizontally extending pivot axis.

In an advantageous embodiment of the slicer according to the invention, the slicer has a lateral guide surface adjacent to the support surface. This guide surface extends substantially transversely to the support surface and parallel to said direction of travel in order to enable the bread to be guided as it moves between the compartments.

According to a very interesting embodiment of the slicer according to the invention, the support surface is inclined between said lateral sides with respect to the horizontal line, so that a loaf of bread which is placed on the support surface rests against said guide surface.

In a very advantageous manner, the bagging pallet has a side edge connecting to the guide surface in the receiving position of the pallet.

The invention also relates to a method for automatically slicing a loaf of bread and for bagging the bread after it has been sliced with a slicer having a frame with a front side, opposite to a rear side, and two lateral sides extending between the front side and the rear side. This slicer comprises a loading compartment connected to a receiving compartment and the loading compartment is adjacent to said front side while the receiving compartment is situated near said rear side.

The method according to the invention comprises the following steps:

- a loaf of bread to be sliced is placed in the loading compartment of the slicer by a user who is positioned in front of the front side of the slicer,
- moving the loaf to a receiving compartment and returning the loaf to the loading compartment from the receiving compartment in a direction of travel of the loaf which is inclined with respect to the horizontal line,
- cutting successive slices of the bread as it moves downward in the direction of travel between the compartments, the slices being cut from the bread in a cutting plane extending substantially perpendicularly to said direction of travel of the bread.

This method is characterized in that the bread is moved along said direction of travel inclined at an angle ($\alpha$) between 25° and 70°, in particular between 30° and 60°, with respect to a horizontal line that extends perpendicularly to the front side of the slicer. This angle ($\alpha$) is, for example, between 35° and 55°.

According to a preferred embodiment of the method according to the invention, the bread is received by a bagging pallet following the movement of the bread from the receiving compartment to the loading compartment in said direction of travel. This pallet extends substantially along said direction of travel upon receiving the bread.

Other details and particularities of the invention will become clear from the following description of some particular embodiments of the slicer and the method according to the invention, given by way of example without being limitative in any way, with reference to the accompanying drawings.

Figure 10A:
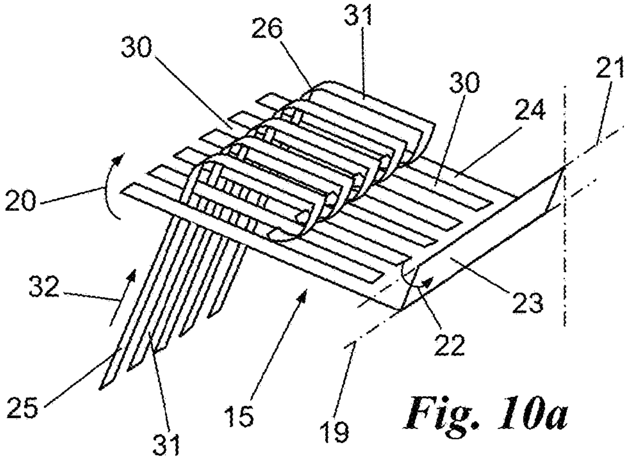

FIG. 10*a* shows a view in perspective of a bagging pallet and a movable support according to the invention, which can be used in the slicer of FIGS. 2 to 9.

Figure 10B:
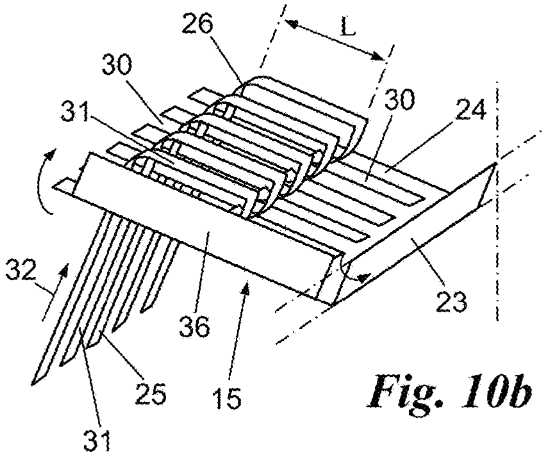

FIG. 10*b* shows a variant according to the invention of the bagging pallet and the movable support shown in FIG. 10*a*, in which the pallet has a side edge.

FIGS. 11 to 18 show a schematic side view of a bread slicer according to a second embodiment of the invention, illustrating different steps as of the introduction of a loaf of bread to be sliced until the removal of the sliced bread.

Figure 19:
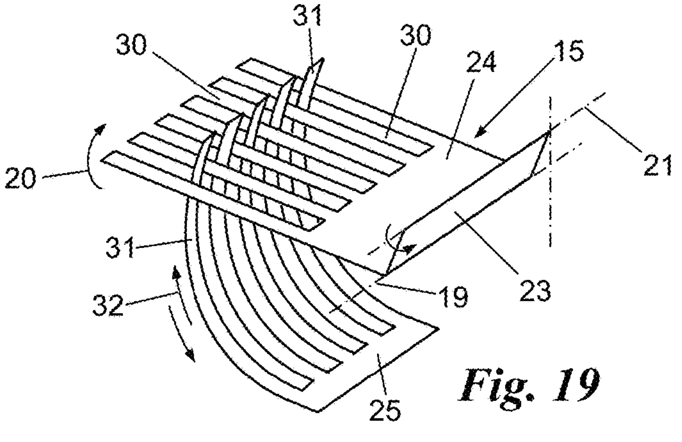

FIG. 19 shows a view in perspective of an embodiment of a movable support and bagging pallet according to the invention, used in the slicer of FIGS. 11 to 18.

FIGS. 20 to 25 show a schematic side view of a bread slicer according to an interesting embodiment of the invention, illustrating different steps from the introduction of a loaf of bread to be sliced until the removal of the sliced bread.

FIGS. 26 to 31 show a schematic side view of a bread slicer according to another embodiment of the invention, illustrating different steps from the introduction of a loaf of bread to be sliced until the removal of the sliced bread.

FIGS. 32 to 36 show a schematic side view of a bread slicer according to an alternative embodiment of the invention, illustrating different steps from the introduction of a loaf of bread to be sliced until the removal of the sliced bread.

Figure 1:
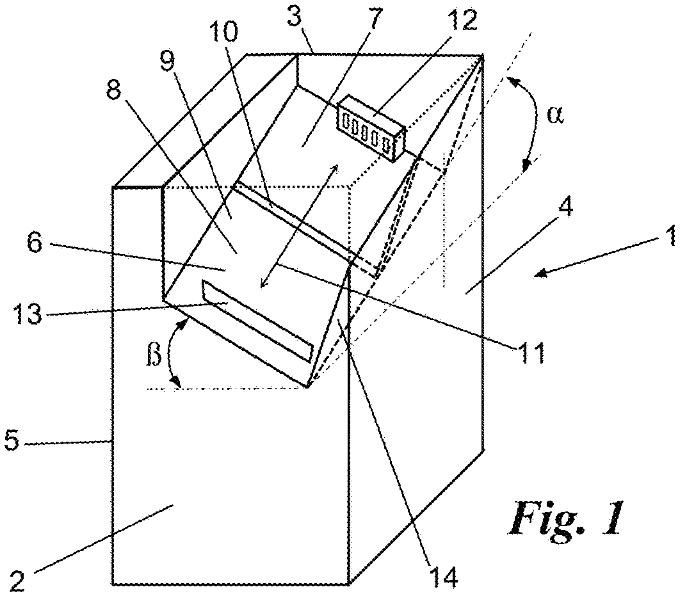
FIG. 1 is a highly schematic view in perspective of a bread slicer according to the invention.
Figure 37:
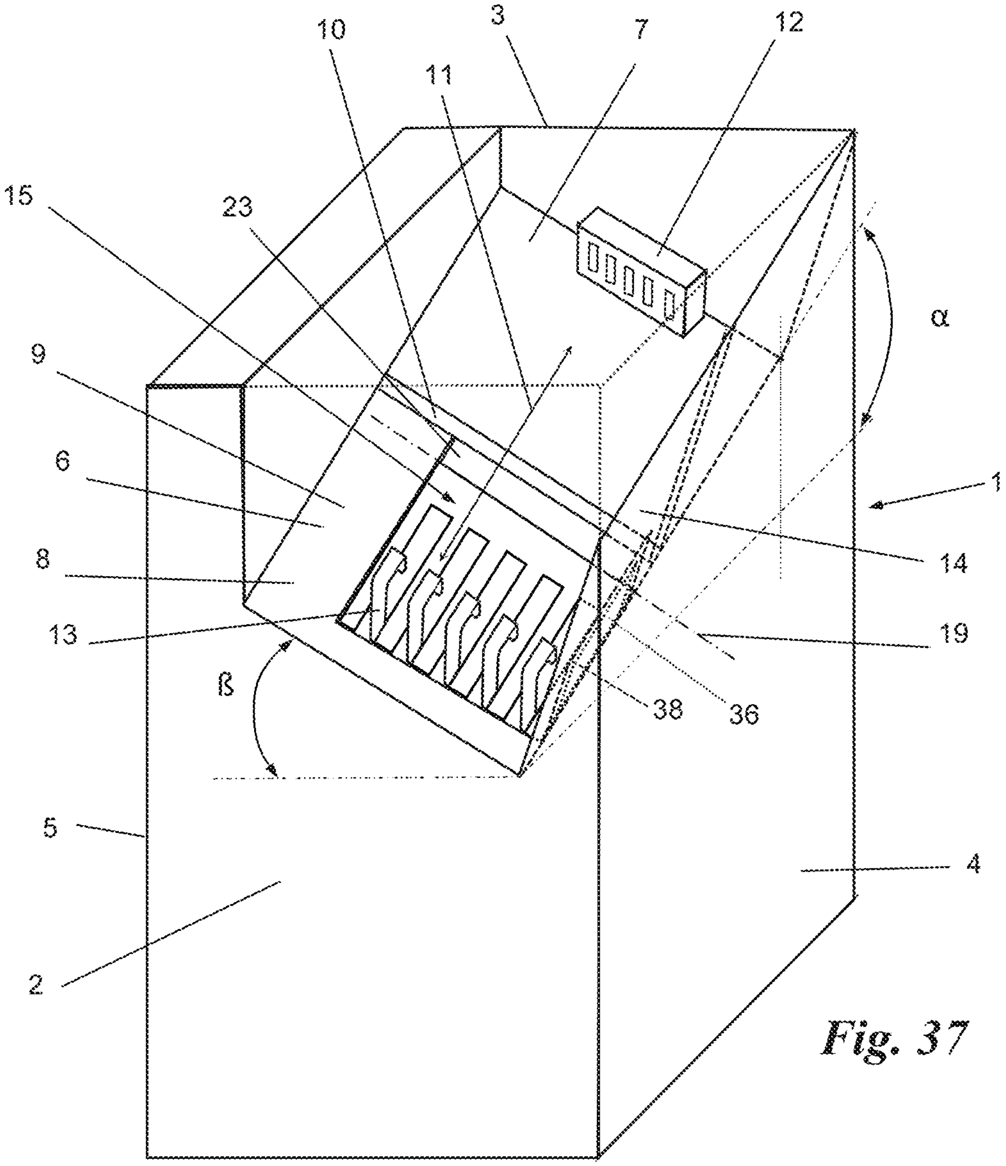

FIG. 37 illustrates the bread slicer of FIG. 1 showing the bagging pallet in a receiving position.

Figure 38:
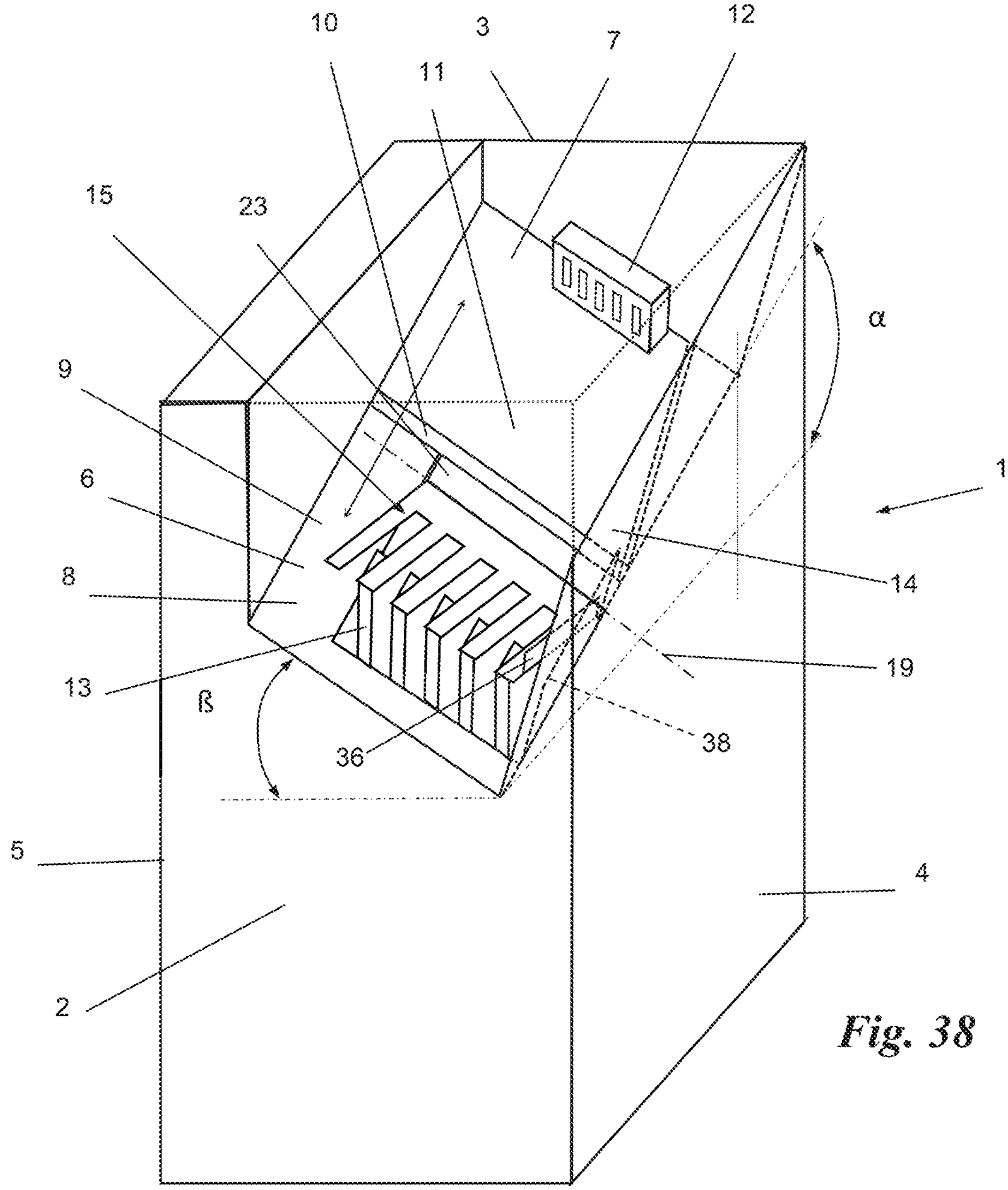

FIG. 38 illustrates the bread slicer of FIG. 1 showing the bagging pallet in a bagging position.

In the various figures, the same reference numbers refer to similar or identical elements.

The invention generally relates to an automatic bread slicer which makes it possible to bag a sliced bread in a simple manner. Such a slicer is shown very schematically in FIG. 1.

The slicer 1 has a rectangular base and comprises a frame with a front side 2 opposite a rear side 3 and two lateral sides 4 and 5 extending between the front side 2 and the rear side 3. The sides of the frame preferably each extend approximately in a straight, vertical plane. The front side 2 and the rear side 3 are, for example, perpendicular to the lateral edges 4 and 5.

Adjacent to the front side 2, the interior of the slicer 1 includes a loading compartment 6 which is provided for placing a loaf of bread to be sliced in and for retrieving the bread after it has been sliced. This loading compartment 6 is connected to a receiving compartment 7 which is provided in the slicer 1 near the rear side 3.

In order to be able to introduce a loaf of bread in the slicer and to retrieve this bread after it has been cut, an access opening 8 is provided which gives access to the loading compartment 6. For clarity's sake in the figures, this access opening is not represented, but only indicated by the reference number 8. The access opening is accessible from said front side 2 by a user who is positioned in front of said front side 2 to place a loaf of bread to be sliced in the loading compartment 2 and to retrieve the bread after it has been sliced. This access opening 8 is therefore provided in the front side 2 and/or in the upper side of the slicer 1 facing the loading compartment 6. Preferably, this access opening 8 can be closed by a cover, not shown in the figures, during the operation of the slicer 1.

A support surface 9 for the bread extends in both said compartments 6 and 7. Between these compartments 6 and 7 is provided a slot 10 to allow the passage of a cutting member along a cutting plane. The cutting member is provided for cutting slices of bread and includes, for example, a circular blade which is driven about its axis. This cutting member with the circular blade can be moved along a cutting plane through said slot 10. The cutting plane preferably extends perpendicularly to the support surface 9 between said compartments 6 and 7.

After a loaf of bread to be sliced has been introduced in the loading compartment 6, it is moved in a direction of travel, as indicated by the double arrow 11, to the receiving compartment 7. This direction of travel 11 extends between the front side 2 and the rear side 3 of the frame and parallel to the support surface 9.

Preferably, this direction of travel 11 of the bread is substantially parallel to a vertical plane that extends transversely to said front side 2 and said rear side 3, or approximately parallel to the lateral sides 4 and 5 of the frame of the slicer 1.

The slicer also comprises a movable push rod 12 which can be moved in said direction of travel 9 of the bread to move the bread between said compartments 6 and 7 through the cutting plane. This push rod is 12 known to those skilled in the art and comprises, for example, retractable claws. A push rod with retractable claws is described, for example, in document DE 202011005113.

This push rod 12 cooperates with a movable support 13 which can also be moved along said direction of movement 11 of the bread. Such a movable support 13 is known to those skilled in the art and allows to support the bread to be sliced or to support the slices that are cut from the bread. To this end, the movable support 13 is driven along the direction of travel of the bread.

The push rod 12 and the movable support 13 may, for example, be driven by means of a toothed belt extending along and adjacent to the support surface 9, as is shown for example in EP 2045053.

In the slicer according to the invention, the support surface is inclined at an angle $\alpha$ with respect to a horizontal line which extends perpendicularly to the front side 2 of the slicer 1, as shown in FIG. 1. This angle $\alpha$ is between 25° and 70°, in particular between 30° and 60°. An angle $\alpha$ that is between 35° and 55° seems to offer the best result with respect to the bread cutting quality and ergonomics for the user. In order not to make the slicer too high, the angle $\alpha$ is, for example, preferably in the range of 35° to 45°.

Optionally, the support surface 9 may also be inclined at an angle $\beta$ with respect to a straight line that extends transversely with respect to the lateral sides 4 and 5 of the slicer 1, as shown in FIG. 1. This angle β is, for example, between 15° and 45°.

In this case, the slicer 1 has a lateral guide surface 14 that is adjacent to the support surface 9. This guide surface 14 extends substantially transversely to the support surface 9 and parallel to said direction of travel 11 to allow the bread to be guided as it moves between the compartments 6 and 7.

When a loaf of bread is placed in the loading compartment 6 of a slicer having a support surface that is inclined at an angle α and an angle β, as shown in FIG. 1, the loaf of bread slides over the support surface 9 up to said guide surface 14 and, optionally, the movable support 13. Next, the push rod 12 is approached towards the bread and the claws of the push rod 12 are activated in order to grip the bread on the opposite side of the movable support 12. The bread is then moved towards the receiving compartment 7 by the movement of the push rod 12 as it slides over the support surface 9 and against the guide surface 14.

In FIGS. 2 to 9 and 10*a*, a very interesting embodiment of the slicer 1 according to the invention is shown schematically. The support surface 9 is inclined at an angle α as explained above and extends into the loading compartment 6 and into the receiving compartment 7. The angle α is in this example about 45°. Between the compartments 6 and 7, a slot 10 is provided in the support surface 9 that allows the passage of a cutting member, such as a circular blade, which can move along a cutting plane 17. This cutting plane 17 extends substantially perpendicularly with respect to the support surface 9 and with respect to said direction of travel 11 of the bread.

Figure 9:
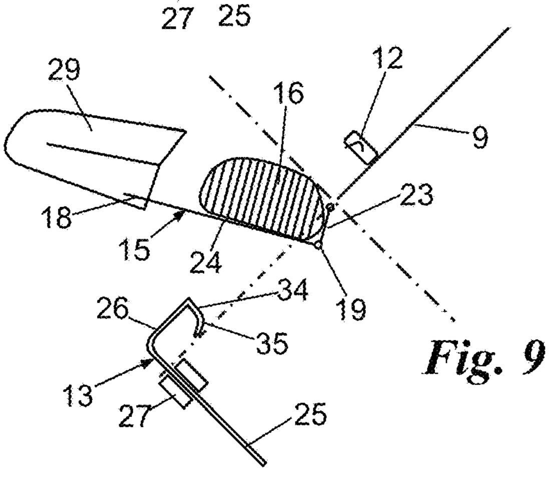
Figure 11:
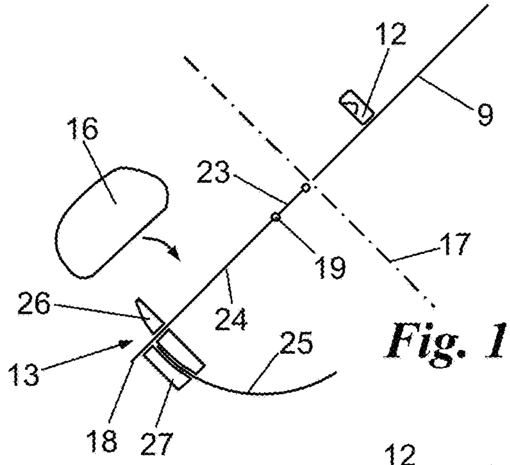
Figure 12:
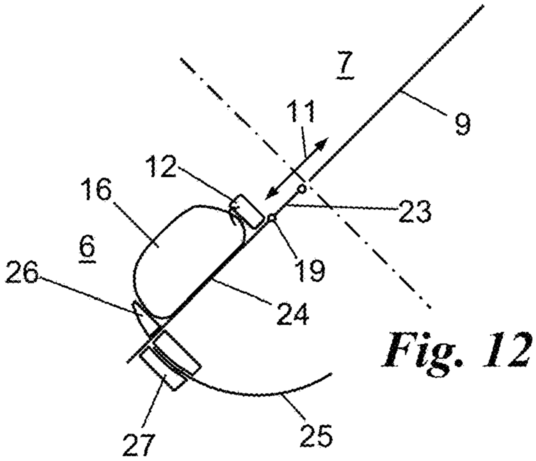
Figure 13:
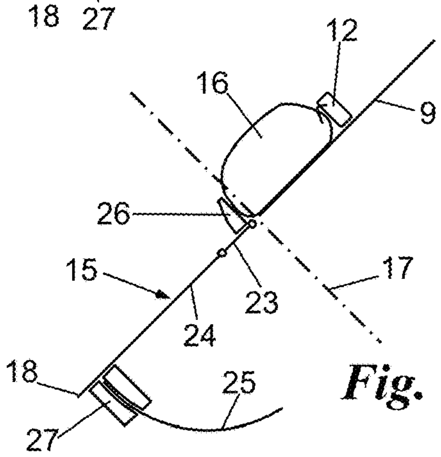
Figure 14:
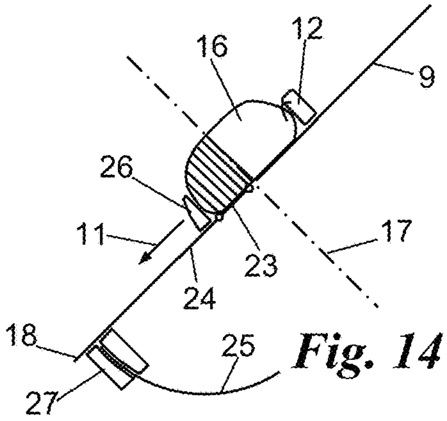
Figure 15:
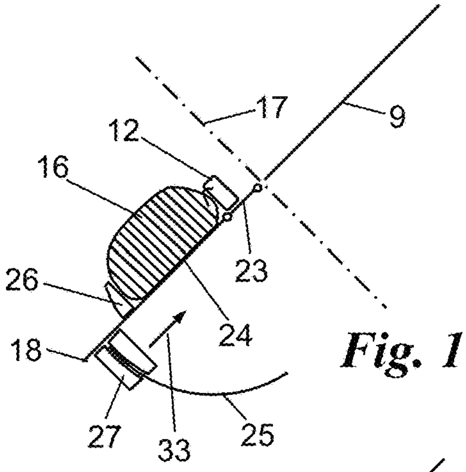

This slicer comprises a bagging pallet 15 which is provided in the loading compartment 6. The bagging pallet 15 can be moved between a receiving position in which the pallet 15 extends along the plane of the support surface 9, as shown in FIGS. 2 to 6, and a bagging position in which at least one end of the pallet 15 is elevated in relation to the plane of the support surface 9, as shown in FIG. 9. The bagging pallet 15 may comprise a pallet separate from the support surface 9 which, in said receiving position, rests on said support surface 9. In another embodiment, said pallet 15 extends into a recess provided in the support surface 9 and, in the receiving position, the pallet 15 thus extends in the extension of said surface 9.

Figure 2:
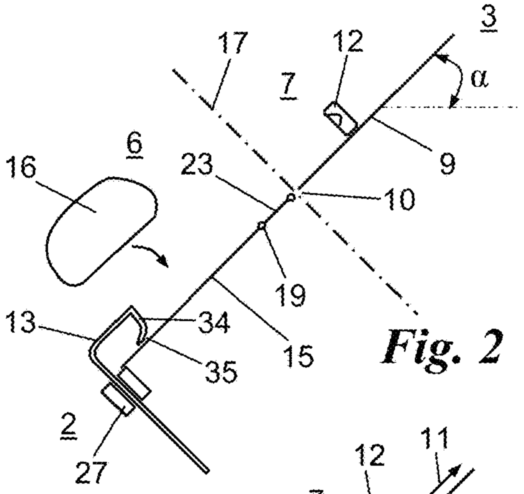
FIGS. 2 to 9 show a schematic side view of a bread slicer according to a first embodiment of the invention, illustrating different steps as of the introduction of a loaf of bread to be sliced until the removal of the cut bread.
Figure 3:
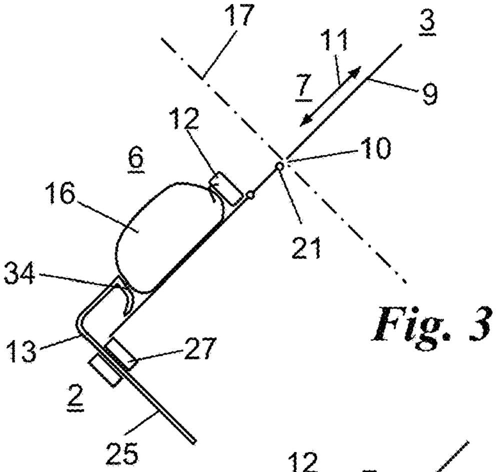

FIG. 2 shows a loaf of bread 16 to be sliced that is placed, by a user, in the loading compartment 6 on the support surface 9 as of the front side 2 of the slicer 1. Thus, the user is situated in front of the front side 2 of the slicer. The bread 16 is placed against a movable support 13 that extends above the plane of the support surface 9 as shown in FIG. 3. After the bread has been placed in the loading compartment 6, a push rod 12 with retractable claws is moved from the receiving compartment 7 to the end of the bread 16 opposite the end that rests against the movable support 13. Then, the claws are activated to grasp the loaf of bread 16 as shown in FIG. 3.

Figure 4:
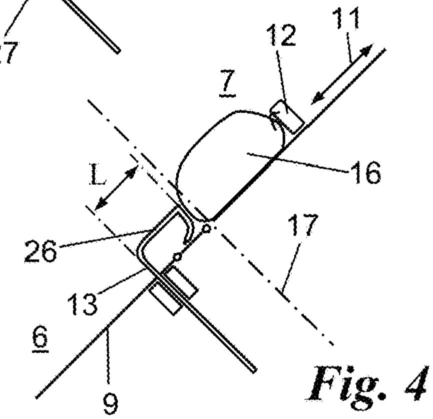

FIG. 4 illustrates how the push rod 12 is then moved with the bread 16 to the receiving compartment 7. The movable support 13 is also moved up to a distance from the cutting plane 17 which corresponds to the thickness of the first slice of bread to be cut from the loaf 16 or up to a distance that is somewhat larger. When the bread has passed almost completely through the cutting plane 17 and a portion corresponding to the thickness of a slice to be cut is still in the loading compartment, the movement of the push rod 13 is stopped. Then, the cutting member is activated and a circular blade is moved through the bread 16 along the cutting plane 17 to cut a first slice of the bread 16.

It is also possible for the bread 16 to be moved from the loading compartment 6 to the receiving compartment by pushing it by the movable support 13. The bread 16 can, for example, be moved forward until it is situated entirely in the receiving compartment 7 by the action of the push rod 14 and/or by the displacement of the movable support 13. The bread is then lowered through the cutting plane 17 to be cut into slices.

Figure 5:
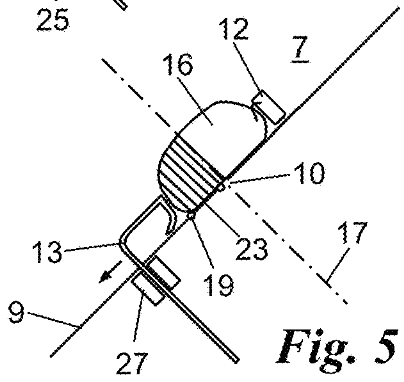

The push rod 12 is returned, together with the bread 16, to the loading compartment 6 in discrete steps corresponding to the thickness of the slices to be cut. This movement takes place in said direction of travel 11. After each step, the circular blade is driven along the cutting plane 17 to cut a next slice of bread 16. The movable support 13 is moved synchronously with the push rod 12 so that the cut slices can rest against the support and will not fall off. Thus, successive slices are cut from the loaf 16 as it moves downward in the direction of travel 11 between the compartments 6 and 7. FIG. 5 shows a loaf of bread partially cut in this manner.

Figure 6:
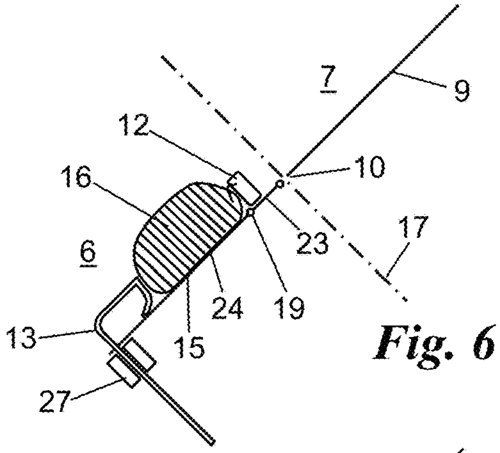

As it moves to the loading compartment 6 from the receiving compartment 7, the sliced bread 16 is received by said bagging pallet 15 which is in its receiving position. The bread 16 is being held between the movable support 13 and the push rod 12 until it is situated entirely on the bagging pallet 15, as shown in FIG. 6. The claws are then retracted towards the inside of the push rod 12, whereupon the latter is returned to the receiving compartment 7.

In order to bag and retrieve the sliced bread 16, the bagging pallet 15 is, after the bread 16 has been received by the latter, moved from its receiving position, as shown in FIG. 6, to a bagging position in which at least one end of the pallet 15 is elevated with respect to said direction of travel 11. The movement of the bagging pallet 15 to the bagging position together with the bread 16 is illustrated in FIGS. 7 and 8.

Figure 7:
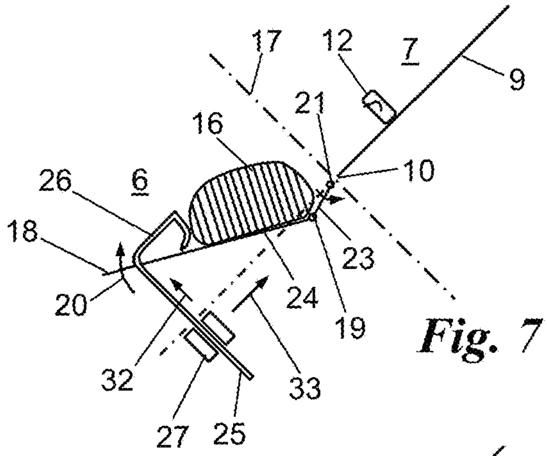
Figure 8:
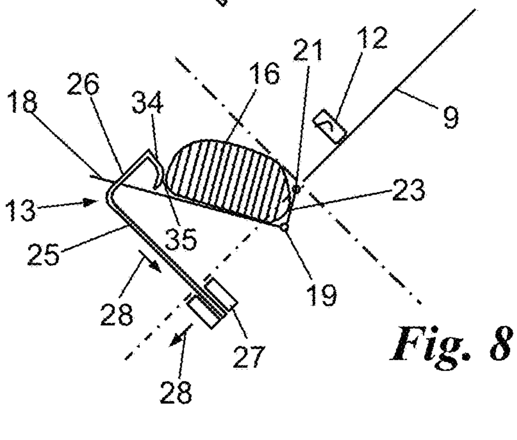

In the embodiment of the slicer of FIGS. 2 to 9, the lower end 18 of the bagging pallet 15 is raised relative to the plane of the support surface 9. In particular, the pallet 15 is moved together with the bread with respect to said direction of travel 11 towards a bagging position in which at least said end 18 of the pallet 15 is elevated with respect to said direction of travel of the bread 11. FIGS. 8 and 9 show the bagging pallet 15 in the bagging position.

To move the bagging pallet 15 from the receiving position to the bagging position, the pallet 15 is driven about a pivot axis 19 as indicated by arrow 20 in FIG. 7. This pivot axis 19 preferably extends horizontally and is itself rotatably mounted about a rotation axis 21 that extends adjacent to the slot 10. Thus, when the pallet 15 is moved to the bagging position, the pivot axis 19 moves about the axis 21 as indicated by arrow 22 in FIG. 7.

The portion of the support surface 9 that extends between the axes 19 and 21 thus constitutes a stop plate 23 of the pallet 15. When the end 18 of the bagging pallet 15 is elevated relative to the plane of the support surface 9, this stop plate 23 will straighten up substantially transversely to the base 24 of the pallet 15 that extends on the other side of the pivot axis 19.

Thus, the bagging pallet 15 comprises a base plate 24 and a stop plate 23, which can be moved with respect to each other and which extend in the plane of the support surface 11 in said receiving position, whereas in the bagging position, the stop plate 23 extends substantially transversely to the base plate 24 in order to enable a sliced loaf 16 to be supported on the base plate 24 and against the stop plate 23.

In the bagging position of the pallet 15, the latter, in particular the base plate 24, extends horizontally or preferably somewhat inclined to the horizontal so that the loaf of bread 16 that is present on the pallet 15 will be supported against the stop plate 23.

In order to hold the slices of the bread 16 together as it moves to the bagging pallet 15, the sliced bread is held and possibly slightly clamped between the push rod 12 and the movable support 13, as shown in FIG. 6.

As the bagging pallet 15 is moved to its bagging position, the movable support 13 is moved together with the pallet 15 and the bread 16 to ensure that the bread 16 is held between this movable support 13 and the stop plate 23. This prevents the slices of bread from coming loose from each other or from falling.

The movable support 13 comprises a metal or plastic plate, a first part 25 of which extends substantially transversely to the direction of travel 11 of the bread or to the plane of the support surface 9. The first part 25 is connected to a second part 26 which extends above the plane of the support surface 9. This first part 25 is guided and driven in its longitudinal direction by a drive unit 27 which is provided above the plane of the supporting surface 9. The drive unit 27 itself is driven such that it can move parallel to said direction of travel 11. This movement of the drive unit 27 is illustrated in FIGS. 2 to 9.

Consequently, the movable support 13 can be simultaneously moved transversely to the plane of the support surface 9 and parallel to the direction of travel 11. This double movement allows the movable support 13 to maintain contact with the sliced loaf while the bagging pallet 15 is moved to its bagging position, as shown in FIGS. 7 and 8. After the bagging pallet has reached its bagging position, the movable support 13 is moved to release the bread and the bagging pallet 15, as indicated by arrows 28 in FIG. 8. Thus, the movable support 13 is lowered to its initial position where said second part 26 extends just above the plane of the support surface 9, as shown in FIG. 9. Next, a bag 29 is slid over the pallet 15 and the loaf 16 as a whole by a user standing in front of the front side 2 of the slicer, as shown in FIG. 9. The bag 29 containing the bread 16 is then removed from the pallet 15 by the user.

FIG. 10*a* shows in more detail the bagging pallet 15 and the movable support 13 which can be used in the slicer of FIGS. 2 to 9. The pallet 15 has a succession of parallel recesses 30 extending next to each other across the width of the pallet 15. The width of the pallet preferably extends substantially perpendicularly to said direction of travel of the bread 11 or parallel to the front side of the slicer.

The movable support 13, shown in FIG. 10*a*, comprises a succession of fingers 31 which are distributed substantially parallel across the width of the pallet 15. These fingers 31 are arranged such that they can be moved through the recesses 30 of the bagging pallet 15.

Thus, when the bagging pallet 15 is in the receiving position, the fingers 31 of the movable support 13 extend through the recesses 30 of the pallet 15. This allows said second part 26 of the movable support 13 to move above the plane of the support surface 9 while said first part moves, at least partially, below that plane. Thus, the fingers 31 of the movable support 13 are moved along the elongated recesses 30 of the bagging pallet 15.

During the movement of the bagging pallet 15 from the receiving position to the bagging position, said first part 25 of the movable support is moved transversely to the plane of the support surface 9, as indicated by arrow 32 in FIG. 7, and the drive unit 27 is driven simultaneously towards the cutting plane 17, as indicated by arrow 33. In this manner, it is ensured that the movable support 13 maintains contact with the sliced loaf 16 so as to hold it between said support 13 and the stop plate 23 during the movement of the bagging pallet 15.

Said second part 26 of the movable support 13 has a first bearing surface 34 that extends transversely to the surface of the base 24 of the bagging pallet 15 when the latter is in its receiving position. This first bearing surface 34 gradually connects to a second bearing surface 35 that extends at least approximately transversely with respect to the base 24 when the pallet 15 is in its bagging position and the bread is held between this second bearing surface 35 and the stop plate 23. Thus, the contact between the movable support 13 and the loaf 16 is moved from the first bearing surface 34 to the second bearing surface 35 as the pallet 15 advances towards its bagging position, as shown in FIGS. 6 to 8.

This second part 26 of the movable support 13 has a length L in said direction of travel 11 of the bread which is large enough to extend at least up to a distance from the cutting plane 17 corresponding to the thickness of a slice of bread. This is illustrated, for example, in FIG. 4.

After the bagging pallet 15 has reached its bagging position, it is in an inclined position with respect to the horizontal line so that the bread 16 automatically rests against the stop plate 23. The movable support 13 is then lowered into its initial position by the action of the drive unit 27, as already explained above.

The bagging pallet 15 of FIG. 10*a* is used, for example, when the support surface 9 is only inclined at an angle $\alpha$ to a horizontal line that is perpendicular to the front side of the slicer.

When the support surface 9 is also inclined at an angle $\beta$ with respect to a horizontal line extending transversely with respect to the lateral sides 4 and 5, as is the case for the slicer 1 shown in FIG. 1, the bagging pallet 15 has a lateral flange 36, as shown in FIG. 10*b*. This flange 36 serves as a support for the bread 16 to prevent it from slipping off the pallet due to the inclination at the angle $\beta$ between the lateral sides of the slicer 1.

In the receiving position of the pallet 15, this lateral flange 36 connects to said guide surface 14. Therefore, if a loaf of bread 16 to be cut is placed on the bagging pallet 15, when the latter is in the receiving position, the loaf can slide against the flange 36 and the guide surface 14 extending along the flange 36.

As the pallet 15 is moved to its bagging position, the flange 36 breaks away from the guide surface 14 and a distance is created between the guide surface 14 and the flange 36. This distance allows a bag 29 to be slid over the bagging pallet 15 so as to wrap the bread 16 when the pallet is in the bagging position.

It is clear that numerous variations of the slicer according to the invention as shown in FIGS. 1 to 10*b* can be contemplated. FIGS. 11 to 19 show, for example, a slicer with a movable support 13 which includes a first part 25 and a second part 26 which can be moved relative to each other.

The first part 25, in this embodiment of the invention, is formed of a metal or plastic plate that is cylindrically curved about an axis parallel to the axis 19 or 21. The axis of the cylinder which defines the curvature of this first part 25 may, for example, coincide approximately with the axis 21 which extends adjacent to the slot 10. This first part 25 also has fingers 31 which can move through corresponding recesses 30 provided in the base 24 of the pallet 15. This plate which forms the first part 25 is driven by the drive unit 27 so that it can be moved in the direction of travel 11 of the bread or along its curvature as indicated by the arrows 32.

Figure 16:
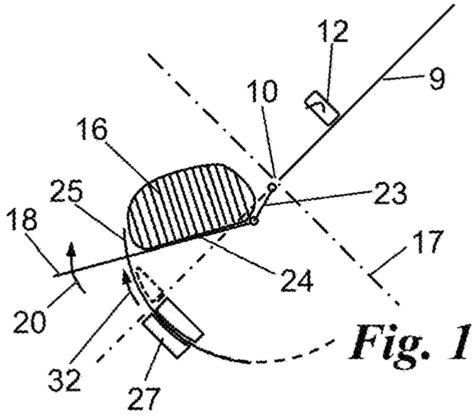
Figure 17:
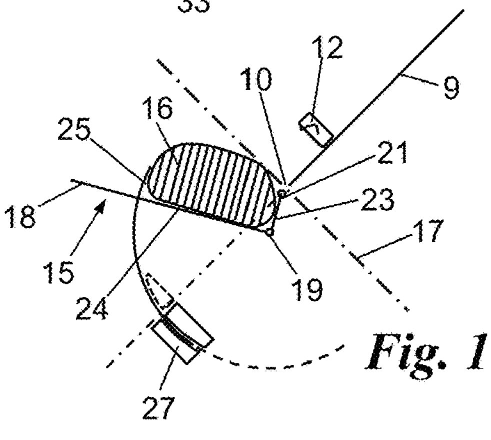
Figure 18:
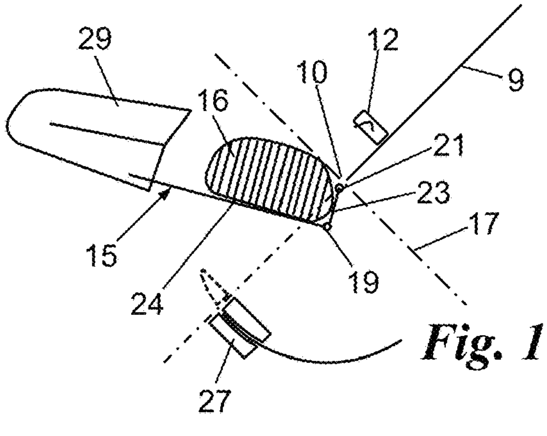
Figure 20:
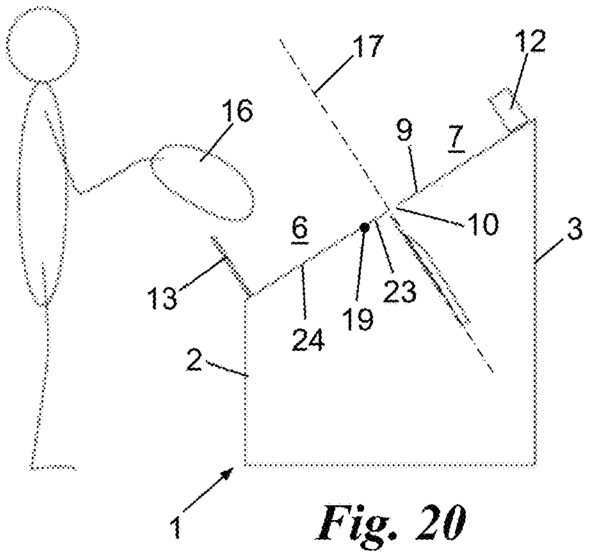
Figure 21:
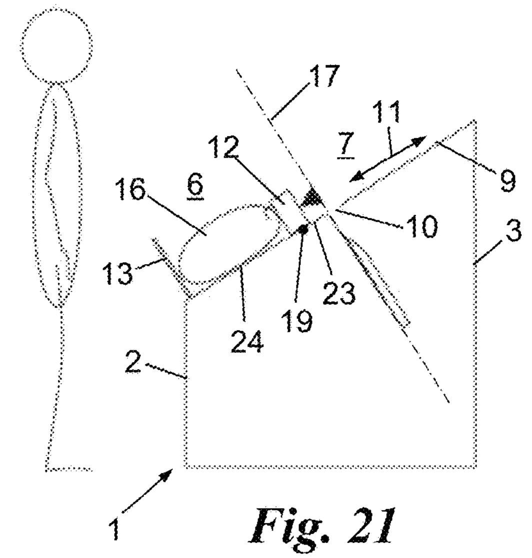
Figure 22:
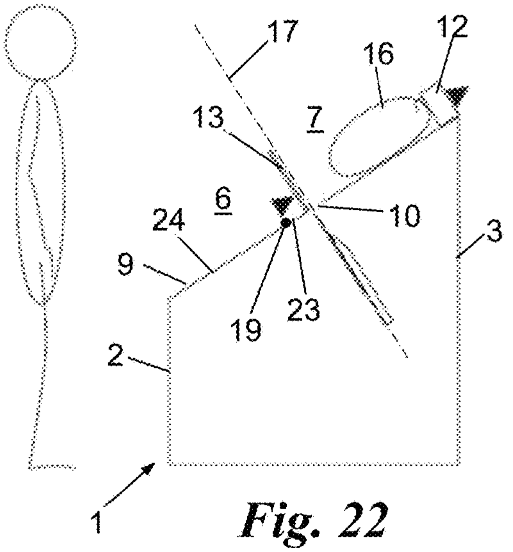
Figure 23:
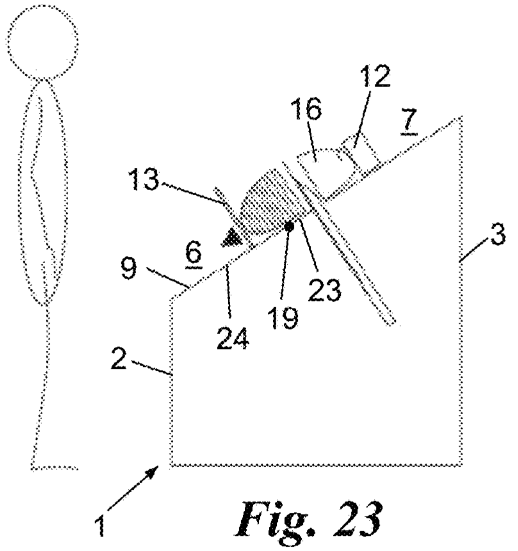

Thus, when a sliced loaf of bread is situated on the base 24 of the bagging pallet 15, which is moved to its bagging position, as shown in FIGS. 16 and 17, said first part 25 is moved by the drive unit 27 in order to hold the sliced loaf of bread between this part 25 and said stop plate 23 while the bagging pallet is moving. After the pallet 15 has reached its bagging position, the curved plate of the first part 25 is lowered so that a bag can be slid over the pallet 15 and the bread 16 to wrap the latter, as shown in FIG. 18.

The second part 26 of the movable support 13 comprises a support which can be moved in said direction of travel 11. This support serves to support the lower part of the loaf 16 during its movement in the direction of travel 11. After the bagging pallet has received the sliced bread and before it is moved to its bagging position, this support forming the second part 26 of the movable support 13 is withdrawn laterally so as to allow the pallet 15 being moved with the bread into the bagging position. Therefore, this support is shown as a dashed line in FIGS. 16 to 18.

Figure 24:
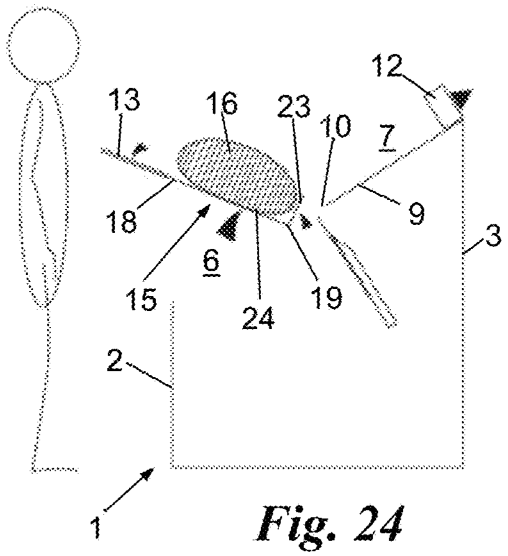

FIGS. 20 to 25 show yet another embodiment of the slicer according to the invention. As shown in FIG. 24, this slicer includes a movable support 23 which is moved together with the bagging pallet 15 to the bagging position to hold the sliced bread between this support 13 and the stop plate 23.

Figure 25:
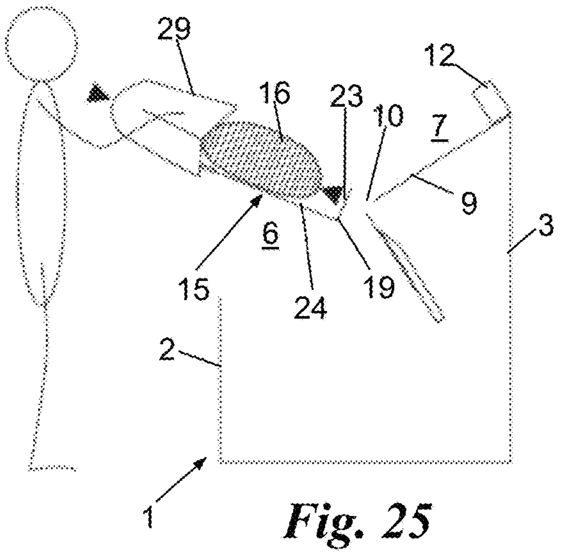
Figure 26:
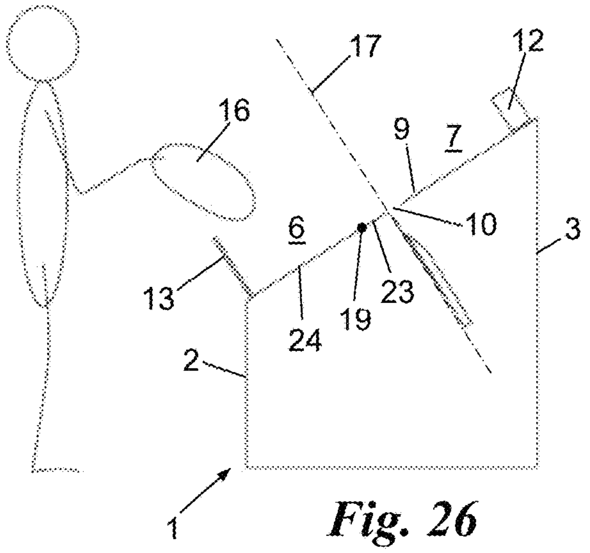
Figure 27:
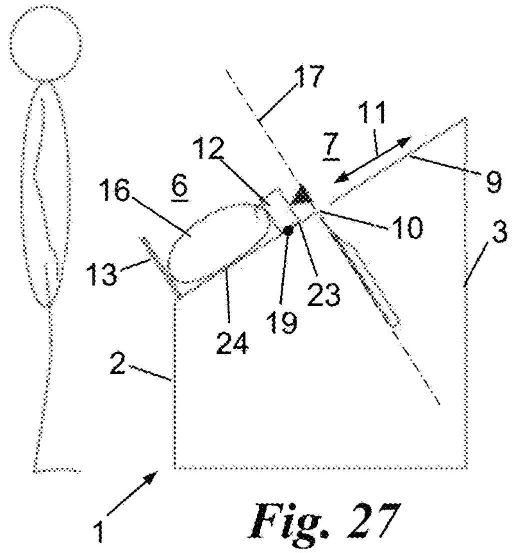
Figure 28:
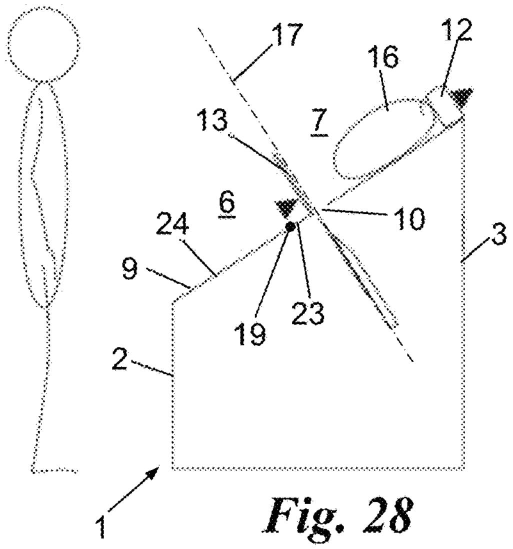
Figure 29:
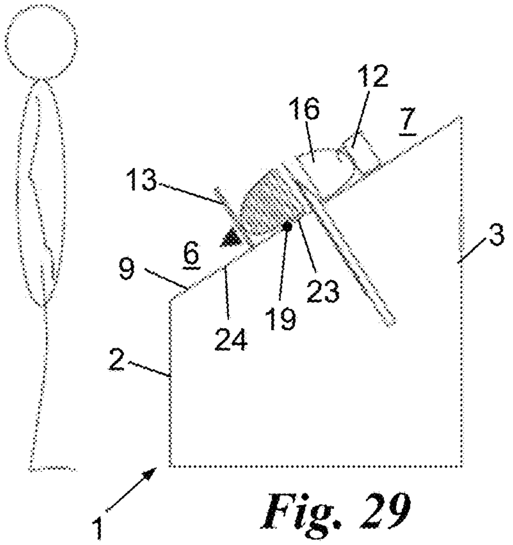
Figure 30:
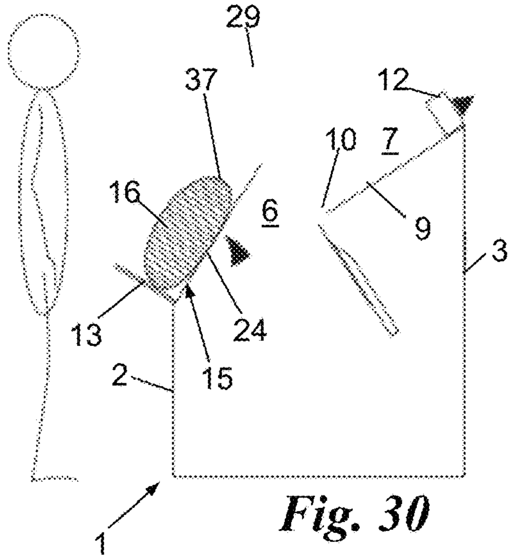
Figure 31:
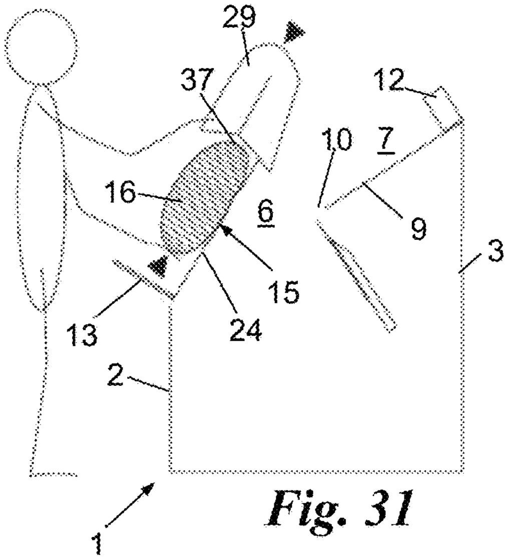
Figure 32:
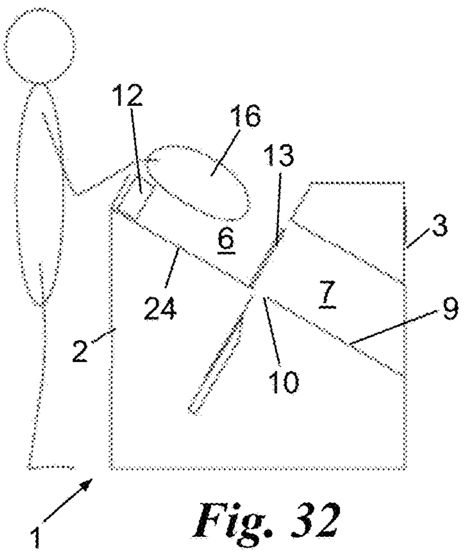
Figure 33:
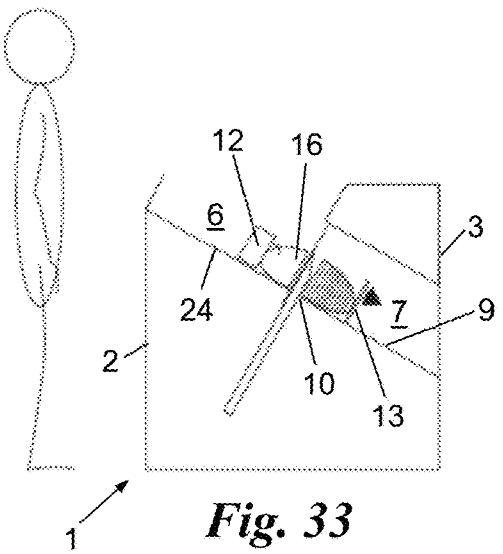

When the bagging pallet 15 has reached the bagging position, the movable support is folded towards the user who is standing in front of the front side of the slicer and in line with the base 24 of the pallet 15. Thus, the user can slide a bag 29 over the movable support 13, the pallet 15 and the bread 16 as a whole in order to retrieve the latter, as shown in FIG. 25.

A further difference from previous embodiments of the slicer according to the invention is that the bagging pallet 15, in particular the base 24, is rotatably mounted about a fixed axis 19. This axis 19 extends into the loading compartment 6 and in the plane of the supporting surface 9. Said stop plate 23 may also rotate about this axis 19 to an upright position relative to the base 24 to form a support for the sliced bread when it is on the bagging pallet 15 as illustrated in FIG. 24.

In the embodiments of the slicer according to the invention, described above, the bagging pallet 15 is moved from its receiving position to the bagging position by a rotation about an axis 19 provided in the vicinity of the cutting plane 17. Thus, the end of the loaf 16 which is directed towards the front side 2, or towards the user, is moved upward when the pallet is moved towards its bagging position.

FIGS. 26 to 31 show another embodiment of the invention, in which the pallet 15 is moved about an axis of rotation 19 situated near the front side 2 of the slicer. Consequently, the end of the loaf 16 that is directed towards the cutting plane 17, or is farthest from the user, is moved upward as the pallet is moved to its bagging position. To wrap the loaf 16 in a bag 29, the user therefore slides a bag 29 over this end 37 of the sliced loaf 16.

Yet another variant of the slicer according to the invention is shown in FIGS. 32 to 36. This embodiment is, among other things, different from the previous embodiments by the presence of a support surface 9 which descends from the front side 2 to the rear side 3 of the slicer. Thus, in this slicer, the bread 16 is sliced as it moves to the receiving compartment 7, whereas in the slicers described above, the bread 16 is sliced as it moves from the receiving compartment 7 to the loading compartment 6. In the slicers described above, the support surface 9 extends upward from the front side 2 to the rear side 3 of the slicer.

Figure 34:
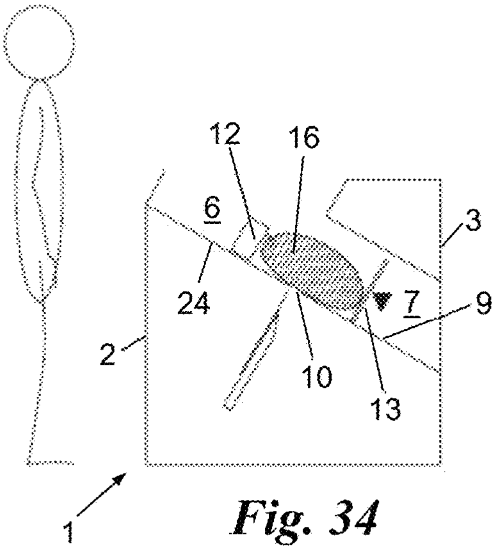

In the embodiment of the slicer shown in FIGS. 32 to 36, the sliced bread is moved from the receiving compartment 7 to the loading compartment 6 by the action of the movable support 13 which pushes against the sliced bread, as shown in FIG. 34, until the bread is situated entirely on the bagging pallet 15.

Figure 35:
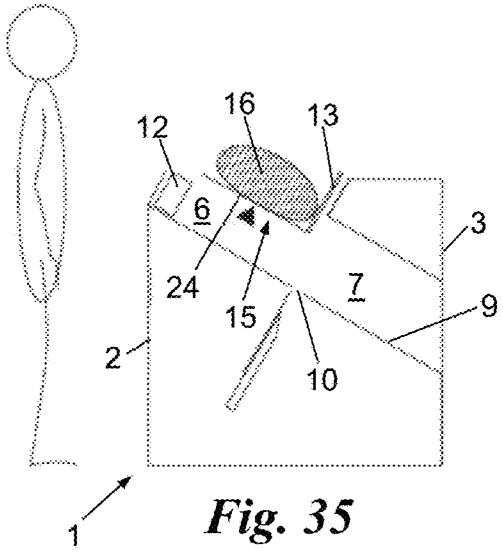
Figure 36:
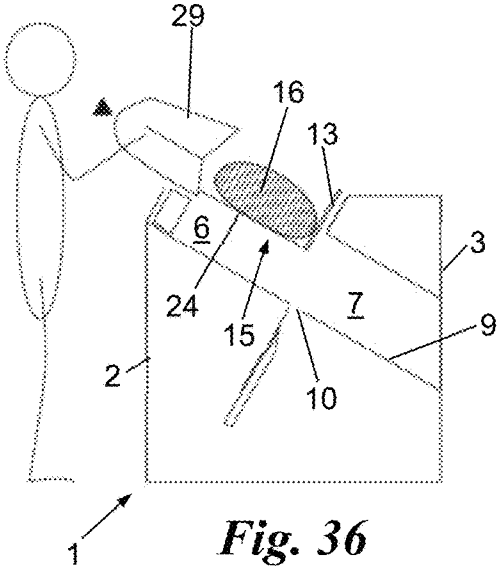

Another difference is that the bagging pallet 15 is displaced together with the movable support 13 to move the pallet 15 from its receiving position to the bagging position, as shown in FIG. 35.

The bagging pallet 15 may include, for example, elongated recesses that extend next to each other, as shown in FIGS. 10*a*, 10*b* and 19. Thus, when sliding a bag 29 over the cut bread and pallet 15, the bag 29 can be slid along the recesses next to the bread 16. This makes it possible to select the size of the bag according to the measurements of the bread.

FIG. 37 illustrates the bread slicer of FIG. 1 showing the bagging pallet 15 of FIG. 10*b* in a receiving position, wherein the bagging pallet 15 has a lateral flange 36 extending along the guide surface 14 in the receiving position of the pallet 15. The guide surface 14 has a recess 38 in which the lateral flange 36 is provided such that the recess 38 extends along the guide surface 14 when the bagging pallet 15 is in the receiving position. FIG. 38 illustrates the bread slicer of FIG. 1 showing the bagging pallet 15 of FIG. 10*b* in a bagging position, in which there is a distance between said flange 36 and the guide surface 14 when the pallet 15 is in the bagging position, the distance allowing to slide a bag over the pallet 15 to wrap the bread.

Naturally, the invention is not limited to the various embodiments described above; on the contrary, still other variants can be considered without departing from the scope of the present invention.

The invention claimed is:

1. A bread slicer having a frame with a front side opposite a rear side and two lateral sides extending between the front side and the rear side, wherein the slicer comprises:

a loading compartment that is connected to a receiving compartment, the loading compartment being adjacent to said front side and the receiving compartment is situated near said rear side, wherein the receiving compartment extends behind the loading compartment with respect to the front side, an access opening for the loading compartment for placing in the loading compartment a loaf of bread to be sliced, the access opening being accessible from said front side by a user who is positioned in front of said front side for placing a loaf of bread to be sliced in the loading compartment and for retrieving the loaf of bread after the loaf has been sliced, a cutting blade which can move along a cutting plane to cut slices off the bread as the bread is moved between said compartments, a support surface for the bread extending in said compartments and having a slot between the compartments to allow the passage of the cutting blade along said cutting plane, the support surface defining a direction of travel of the bread between the front side and the rear side of the frame and parallel to the support surface, wherein the support surface and said direction of travel slope upward from the loading compartment towards the receiving compartment of the slicer, a movable pusher which can move in said direction of travel of the bread in order to move the bread between said compartments through the cutting plane, a movable support which can move in said direction of travel of the bread in order to support and/or push the bread to be cut or the slices of the cut bread, wherein said support surface has an inclination at an angle (α) between 25° and 55°, with respect to a horizontal line which extends perpendicularly to the front side of the slicer, said inclination enabling the loaf to move downward in the direction of travel from the receiving compartment into the loading compartment while cutting successive slices of the loaf, wherein a bagging pallet is provided in the loading compartment, said pallet being movable between a receiving position in which the pallet extends along the plane of the support surface and a bagging position in which at least one far end of the pallet is elevated relative to the plane of the support surface permitting to slide a bag over the pallet from said far end of the pallet.

2. The bread slicer according to claim 1, wherein said direction of travel is parallel to a vertical plane extending transversely with respect to said front side and/or said rear side.

3. The bread slicer according to claim 1, wherein the bagging pallet comprises a base plate and a stop plate, which can move relative to each other and which extend in the plane of the support surface in said receiving position, whereas in the bagging position, the stop plate extends substantially transversely to the base plate so as to allow a cut loaf to be supported on the base plate and against the stop plate.

4. The bread slicer according to claim 1, in which the bagging pallet is pivotally mounted about a horizontally extending pivot axis.

5. The bread slicer according to claim 1, in which the bagging pallet is pivotally mounted about a pivot axis which extends in the plane of the support surface.

6. The bread slicer according to claim 1, having a lateral guide surface adjacent to the support surface and extending substantially transversely to the support surface and parallel to said direction of travel so as to allow the bread to be guided as the bread moves between the compartments.

7. The bread slicer according to claim 6, in which the support surface is inclined between the lateral sides at an angle with respect to the horizontal so that a loaf of bread which is placed on the support surface can rest against said guide surface.

8. The bread slicer according to claim 6, in which the bagging pallet has a lateral flange extending along the guide surface in the receiving position of the pallet.

9. The bread slicer according to claim 8, in which the guide surface has a recess in which the lateral flange is arranged along the guide surface when the bagging pallet is in the receiving position.

10. The bread slicer according to claim 8, in which there is a distance between said flange and the guide surface when the pallet is in a bagging position, said distance allowing to slide a bag over the pallet to wrap the bread.

11. A method for slicing a loaf of bread and for bagging the bread after the bread has been sliced with a slicer having a frame with a front side, opposite a rear side, and two lateral sides extending between the front side and the rear side, said slicer comprising a loading compartment which is connected to a receiving compartment, the loading compartment being adjacent to said front side whereas the receiving compartment is situated close to said rear side, wherein the receiving compartment extends behind the loading compartment with respect to said front side, and wherein the method comprises the following steps:

placing a loaf of bread to be sliced in the loading compartment of the slicer by a user who is positioned in front of the front side of the slicer, moving the loaf to the receiving compartment and returning the loaf to the loading compartment from the receiving compartment in a direction of travel of the loaf which is inclined with respect to the horizontal line, wherein the support surface and said direction of travel slope upward from the loading compartment towards the receiving compartment of the slicer, cutting successive slices of the loaf as the loaf moves downward in the direction of travel from the receiving compartment into the loading compartment, the slices being cut from the bread in a cutting plane extending substantially perpendicularly to said direction of travel of the bread, wherein the bread is moved along said direction of travel inclined at an angle (α) between 25° and 55°, with respect to a horizontal line that extends perpendicularly to the front side of the slicer, wherein the bread is received by a bagging pallet in said loading compartment following the movement of the bread from the receiving compartment to the loading compartment in said direction of travel while being cut into slices, said bagging pallet extending substantially along said direction of travel upon receiving the bread, wherein, after receipt of the bread by the bagging pallet, the pallet is moved together with the bread with respect to said direction of travel towards a bagging position in which at least one far end of the pallet is elevated relative to said direction of travel of the bread, and wherein a bag is slid over the pallet and the loaf of bread as a whole from said at least one far end of the pallet and, next, the bag containing the loaf is removed from the pallet.

* * * * *